Feb. 12, 1957
B. E. PUCKETT
2,780,874
CENTER LOCATER
Filed Oct. 30, 1956
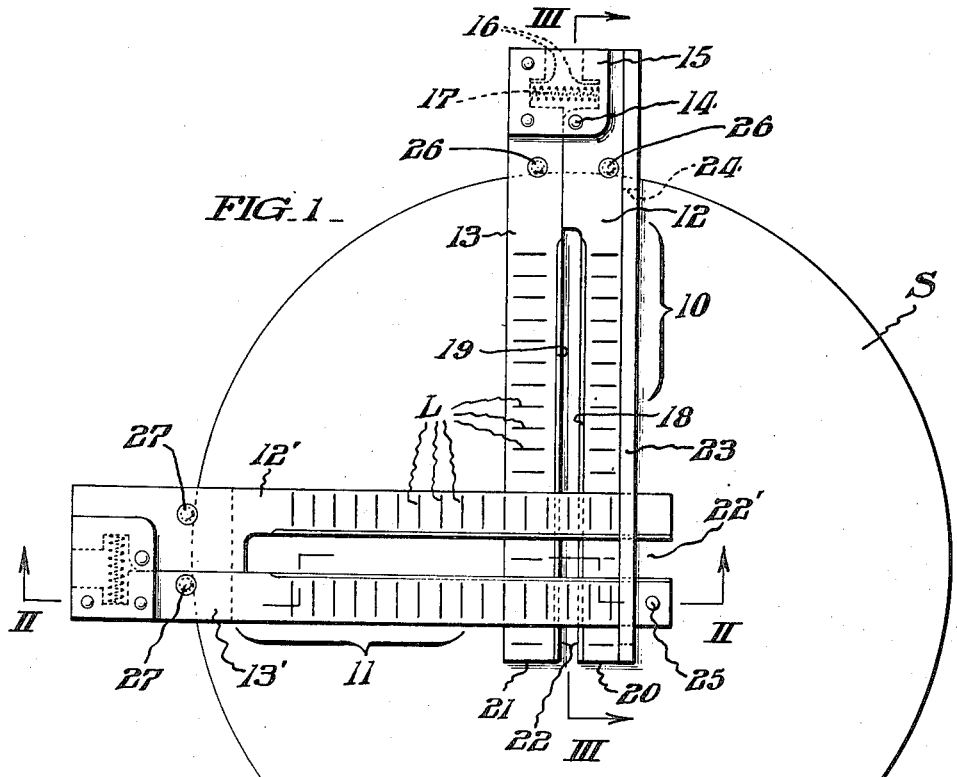
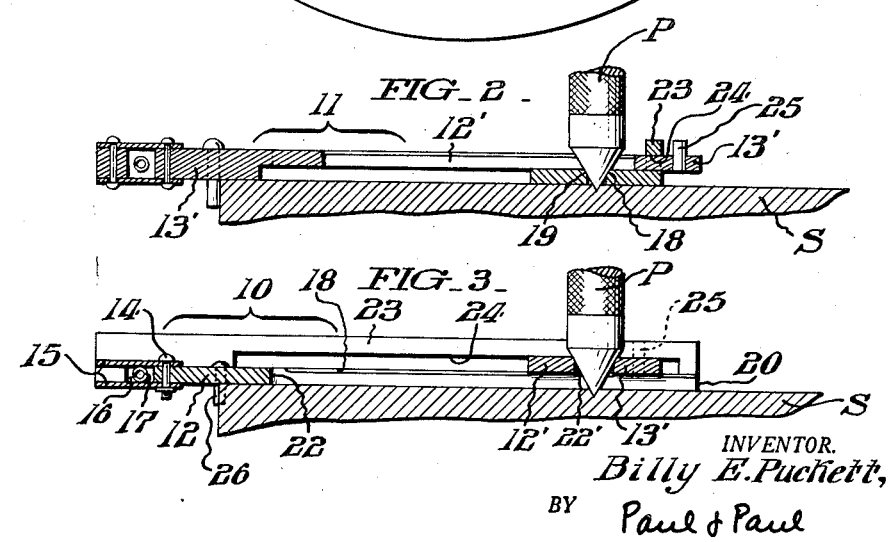
INVENTOR.
Billy E. Puckett,
BY Paul & Paul
ATTORNEYS

2,780,874

CENTER LOCATER

Billy E. Puckett, Rosenberg, Tex.

Application October 30, 1956, Serial No. 619,200

8 Claims. (Cl. 33—191)

This invention relates to a device for locating the center of a cylindrical object. More particularly, the invention concerns a locating device for determining the position of the center of a cylindrical piece of metal bar stock, preparatory to machining the stock.

It is an object of this invention to provide a device for assisting the operator of a lathe in mounting a shaft or the like between centers of the lathe, preparatory to machining the shaft. Although the prior art has suggested a variety of complicated and expensive machines for locating the center of such a shaft, it is a particular object of this invention to provide a low-cost, simple device which is economical to operate and to maintain, for accomplishing this purpose.

Before shafts or other cylindrical metal objects can be mounted between centers, it is necessary to locate the central axis of the shaft exactly, and to drill a conical recess at each end. In accordance with present practice, the machinist mounts one end of the shaft onto the headstock chuck, which may be a four-jaw independent chuck, for example. In this manner, the machinist centers that end of the shaft. The central portion of the shaft is then held steady by a steady-rest, and if power is applied to the lathe the shaft rotates on "center." A drill-bit is then mounted in the tail-stock of the lathe, and the drill-bit is fed into the rotating shaft to provide a recess of the desired depth. The bit is then removed from the tail-stock, a "center" is inserted into the tailstock, and the "center" and tail-stock are brought up against the shaft so that the "center" fits into the recess in the shaft, after which the shaft is ready to be machined. This rather laborious process consumes considerable time, and it is an object of this invention to provide a means for locating the centers accurately in much less time.

Other objects and advantages of this invention will further become apparent hereinafter, and in the drawings of which:

Fig. 1 represents a plan view of a center locater constructed in accordance with the principles of this invention, shown as applied to the end of a cylindrical object;

Fig. 2 represents a sectional view of the center locater and object, taken as indicated by the lines and arrows II—II which appear in Fig. 1; and Fig. 3 represents a sectional view taken as indicated by the lines and arrows III—III which appear in Fig. 1.

Referring now to the specific form of the invention as illustrated in the drawings, it is to be appreciated that the invention is not limited in scope to the specific form there shown, which is merely representative of one preferred manner in which the invention may be practiced. The number 10 designates comprehensively an arm member which is frictionally slidably connected to another arm member 11, as will appear in further detail hereinafter. The arm member 10 has a pair of parallel fingers 12 and 13. Finger 12 is pivoted at pin 14 to hinge plates 15, which are fixed to finger 13. Above the hinge 14, fingers 12, 13 are recessed at 16 providing a recessed area for a spring 17 which is compression. Spring 17 urges the upper ends of the fingers 12, 13 away from one another, therefore urging the free ends 20, 21 together. Intermediate the free ends of the fingers 12, 13 they are provided with an elongated slot 22 which extends parallel to the fingers for a substantial part of their length. Preferably, the upper inner edges 18, 19 of the fingers 12, 13 are upwardly outwardly inclined.

The arm member 11 is similar to the arm member 10 in the respects just described, but one finger 12 of the arm member 10 has a side wall 23 slotted at 24 (see particularly Fig. 3), through which the other arm member 11 extends. Additionally, the slot 22' between the fingers 12' and 13' is wider than the slot 22, for a reason which will become apparent hereinafter.

The width of the slot 24 is substantially equal to thickness of the fingers of the arm member 11, and provides frictional sliding contact between the fingers of the arm members 10, 11, so that they may be adjusted slidably at random with respect to one another. One finger 13' of the arm member 11 carries a pin 25 which extends upwardly and can engage the wall 23, thereby preventing the separation of the arm member 11 from the arm member 10.

Each finger 12, 13 of the arm member 10 has a pin 26 which is arranged to contact the outer cylindrical surface of the shaft S which is to be machined. The pins 26, 26 are spaced equally from the ends 20, 21 of the fingers. A line drawn through the centers of pins 26, 26 is exactly perpendicular to the axis of groove 22. Similarly, the fingers of the arm member 11 have fixed pin members 27, 27 which are equally spaced from the ends of the fingers and which are arranged to contact the outer surface of the shaft S. A line drawn through the centers of pins 27, 27 is exactly perpendicular to the axis of groove 22'. When the arm members 10, 11 are arranged at a substantial angle with respect to each other, as shown in Fig. 1, with all four pins 26, 26, 27, 27 in contact with the surface of the shaft S, their central slotted portions intersect with one another at the center of the shaft, since any two lines drawn perpendicular to tangents must intersect at the center of the circle. It will be observed that the grooves along the centers of the arm members 10, 11 are of such width that they define a rectangular space into which the center-punch P may be placed. When the center-punch P is forced into the shaft S by means of a hammer blow, the fingers 12, 13, 12' and 13' are allowed to spring away from each other in response to the blow, so that they will not be destroyed by the punch P as it enters the metal. Since slot 22' is wider than slot 22, the conical surface of the end of punch P fits against the edges of all four fingers 12, 13, 12', 13', steadying and centering the punch.

Preferably, but not necessarily, a plurality of parallel lines L are scribed on the surfaces of the fingers, to facilitate arranging the respective arm member perpendicular to each other.

The apparatus in accordance with this invention is extremely simple to use, since the operator's left hand may easily maneuver the arm members 10, 11 into place and also hold the center-punch P steady, while the right hand applies a hammer blow to the end of the punch.

Although the members 26 and 27 have been referred to herein as "pins," this expression is not intended to limit this invention to the use of cylindrical pins, since pins or protuberances of various shapes may readily be used.

It will be appreciated that the center locater in accordance with this invention may be applied to shafts of widely varying diameters, from extremely small shafts up to very large ones, without sacrificing accuracy or ease in the use of the device. It will further be understood that the center locater of this invention may easily be mass-produced at low cost, that it is simple to operate, and that it requires little or no maintenance. Additionally, it is readily portable and requires very little storage space.

While this invention has been described with reference to one embodiment thereof, it will be apparent to those skilled in the art that various changes other than those referred to above may be made in the form of the device, that equivalent elements may be substituted for those illustrated in the drawings, that parts may be reversed, and that certain features of the invention may be used to advantage independently of the use of other features, all within the spirit of the invention as defined in the appended claims.

Having thus described my invention, I claim:

1. A device for locating the center of a generally cylindrical object comprising a pair of relatively moveable arm members located in adjacent, parallel planes and slidably engageable with one another, each of said arm members comprising a pair of fingers pivoted to one another with an elongated slot therebetween, pins carried by the respective fingers and arranged along a line perpendicular to the axis of said elongated slot, and resilient means connected between said fingers continuously urging the free ends of said fingers, at the end of said slot, toward one another.

2. The device defined in claim 1, wherein a finger of one of said arm members has an upstanding slotted side wall member, and wherein the other of said arm members extends through said slot.

3. The device defined in claim 2, wherein said other arm member includes a stop member located outwardly of said slotted side wall member, preventing separation of the arm members from one another.

4. The device defined in claim 2, wherein the slot in said side wall member has a width substantially equal to the thickness of the fingers of the other arm member, said wall frictionally engaging said fingers.

5. The device defined in claim 1, wherein one of said arm members is on top of the other, and wherein the slot of the lower arm member is narrower than the slot of the upper arm member.

6. The device defined in claim 5, wherein the upper inner edge of each of said fingers adjacent said grooves, is upwardly outwardly inclined.

7. The device defined in claim 1, wherein said resilient means comprises a compression spring contacting both of said fingers at a location adjacent their pivotal connection.

8. The device defined in claim 7, wherein each of said fingers is cut away adjacent said pivotal connection, providing a recess in which said compression spring is housed.

No references cited.